United States Patent [19]
Riddell

[11] Patent Number: 4,956,935
[45] Date of Patent: Sep. 18, 1990

[54] SPRING POWERED CRAB NET

[76] Inventor: Henry N. Riddell, 204 Clyde St., Lexington, Ky. 40508

[21] Appl. No.: 446,445

[22] Filed: Dec. 5, 1989

[51] Int. Cl.$^5$ .......................................... A01K 713/00
[52] U.S. Cl. ...................................................... 43/105
[58] Field of Search .................. 43/100, 102, 103, 104, 43/105

[56] References Cited

U.S. PATENT DOCUMENTS

| | | | |
|---|---|---|---|
| 99,713 | 2/1870 | Sabins | 43/105 |
| 132,476 | 10/1872 | Livandaus | 43/105 |
| 1,036,574 | 8/1912 | Grane | 43/105 |
| 1,403,171 | 1/1922 | Koenig | 43/105 |
| 2,652,656 | 9/1953 | Glasser | 43/105 |
| 3,645,034 | 2/1972 | Pfahler | 43/105 |
| 4,143,480 | 3/1979 | Bott | 43/105 |
| 4,406,083 | 9/1983 | Hart | 43/105 |
| 4,594,804 | 6/1986 | Misko | 43/105 |
| 4,765,088 | 8/1988 | Stuart | 43/105 |

Primary Examiner—Kurt Rowan

[57] ABSTRACT

A plurality of rigid rods are centrally connected to a hub block and peripherally connected to flexible drawstrings which in turn support a net. The rods are of sufficient length to cause the hub block to be located directly above and over the center of the net and are connected to the hub block by means of any suitable type of spring. A bait spike allows placement of any bait, suitable for attracting crabs, into such a position that the bait will be located directly above and in the center of the net. A retrieval line is attached to the hub block so that upward force on the line causes the springs to partially deform which in turn allows the net to slide downward along the draw strings thereby forming a pouch in the net. This pouch allows for entrapment of the crab for retrieval of the crab fisherman.

3 Claims, 3 Drawing Sheets

SPRING POWERED CRAB NET

In the past crabs have been taken by wire mesh, wooden and metal traps or by baited lines with hand-held nets for retrieval. The traps are bulky and cumbersome and usually require boats for placement and retrieval. The baited lines with hand-held nets result in many lost catches. Other traps have been designed that include complicated levers, ribs, metal spider channels, plates, rings, latches and metal retainer balls. My invention uses the baited line principal but incorporates a net in a way that assures the entrapment and easy retrieval of the crab. It is composed of a minimum of moving parts which in turn essentially eliminates failure due to corrosion or metal fatigue of those moving parts.

The following drawings depict the Spring-Powered Crab Net. The configuration shown is a crab net with four rods and a square net. However, the net need not be square and any suitable number of rods can be employed.

The principal of operation of the Spring-Powered Crab Net can be followed by reference to the drawings. The net, 11, is of any dimension consistent with the laws of the country or state in which it is to be used and adequate in size to accommodate the species of crab to be taken. It is made of lightweight cord with a mesh of sufficient dimension to retain the crab while eliminating undesired smaller marine life. The purpose of the net, 11, is to hold the crab by forming a pouch when upward force is exerted on the retrieval line, 6.

Figure 4:
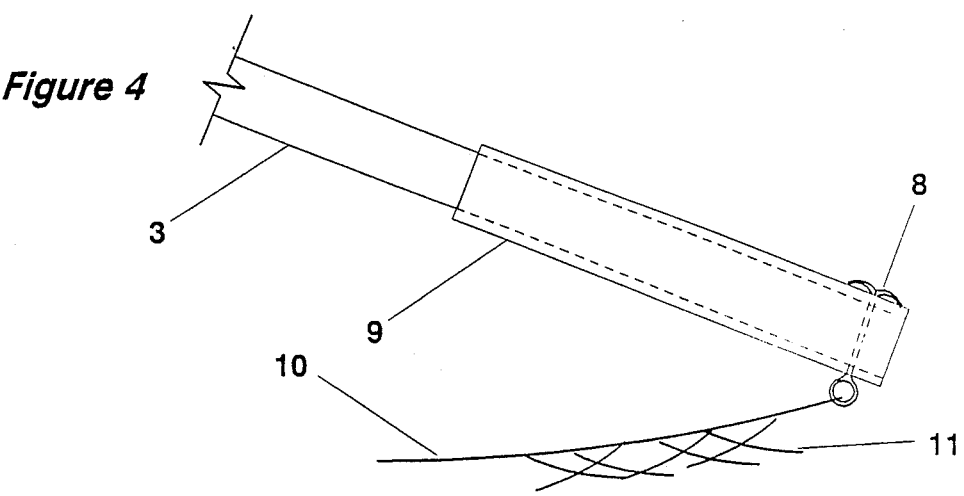
FIG. 4 is a partial view of the crab net at section "B"—"B".

A plurality of draw-strings, 10, are made of fishing line and connect the peripheral ends of the rigid rods, 3. The draw-strings are of a predetermined length sufficient to allow the spreading of the net, 11, into an open, flat position when resting on the water bottom. As illustrated in FIG. 4, the net, 11, is suspended from the draw-strings, 10, by weaving the draw-strings through the mesh of the net along each of its edges.

Figure 5:
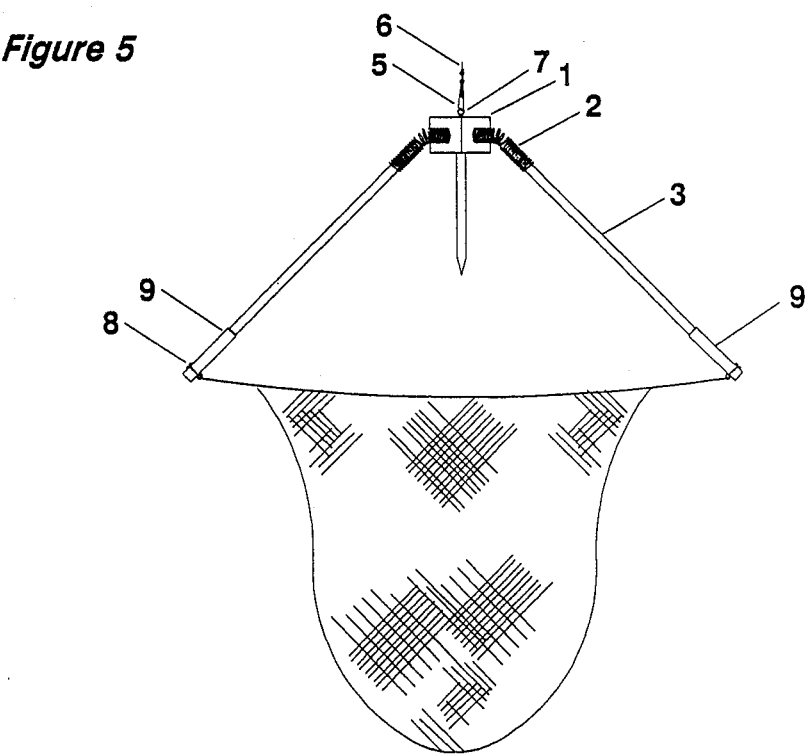
FIG. 5 is a side elevation view of the crab net in the collapsed position with crab entrapped.
Figure 6:
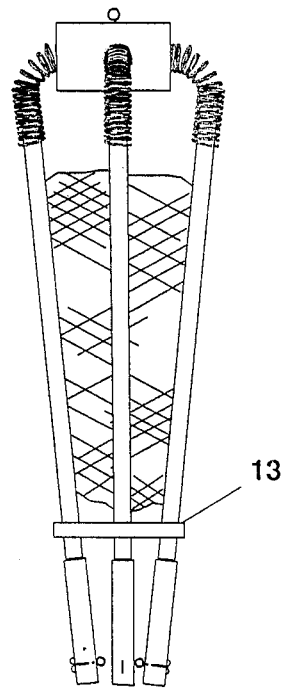
FIG. 6 is a side elevation view of the crab net in the storage position with holding ring in place.

The rigid rods, 3, are made of any suitable material and serve as spreaders to keep the net, 11, open when resting on the water bottom. The central ends of the rods, 3, are connected to the vertical faces of the hub block, 1, by means of rust resistant metal springs, 2. One end of each rod is attached to its companion spring while the opposite end of the spring is recessed into the hub block and held in place by a retainer pin, 12. In the deployment mode, with the net, 11, resting on the water bottom, the springs hold the net in an open, flat position by keeping a constant, upward and outward force on the draw-strings, 10. In the retrieval mode the weight of the crab and the resistance of the water cause the rods, 3, to partially depress. This allows the draw-strings, 10, to become slack. As shown in FIG. 5, the net, 11, then slides down the draw-strings to form a pouch around the crab from which it cannot escape. The springs, 2, also allow the entire device to be folded into the storage mode and held in place by the retainer ring, 13, as shown in FIG. 6. Attached to the lower end of each rod, 3, is a metal sinker, 9, of sufficient total weight to sink the net to the water bottom. This sinker is made of metal sheeting wrapped around the rod end and held in place by a rust resistant sinker pin, 8, one end of which has a pre-formed eyelet to secure the draw-strings, 10, into their proper position.

Figure 1:
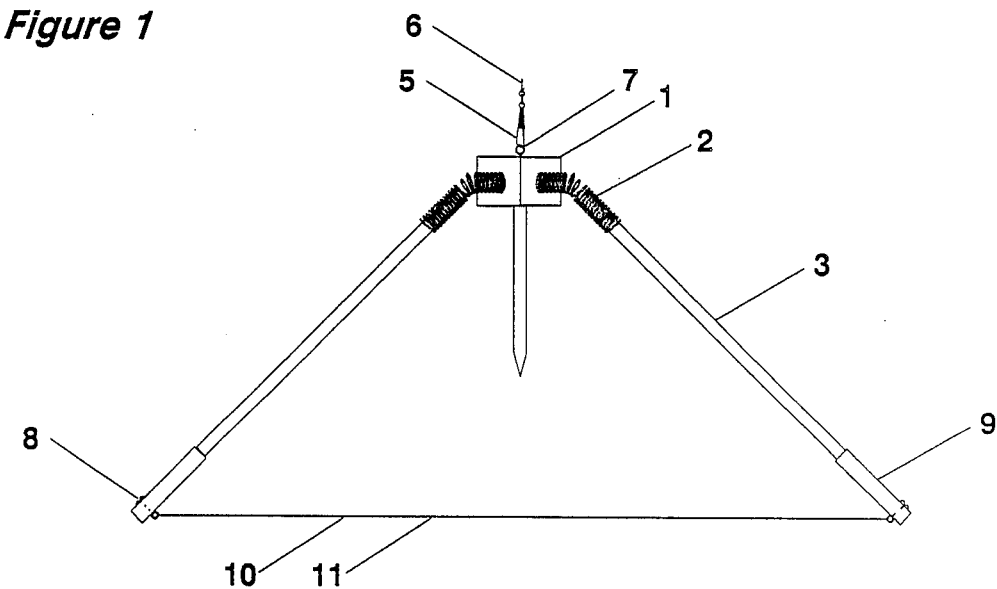
FIG. 1 is a side elevation view of the crab net as it would appear when resting on the water bottom.
Figure 2:
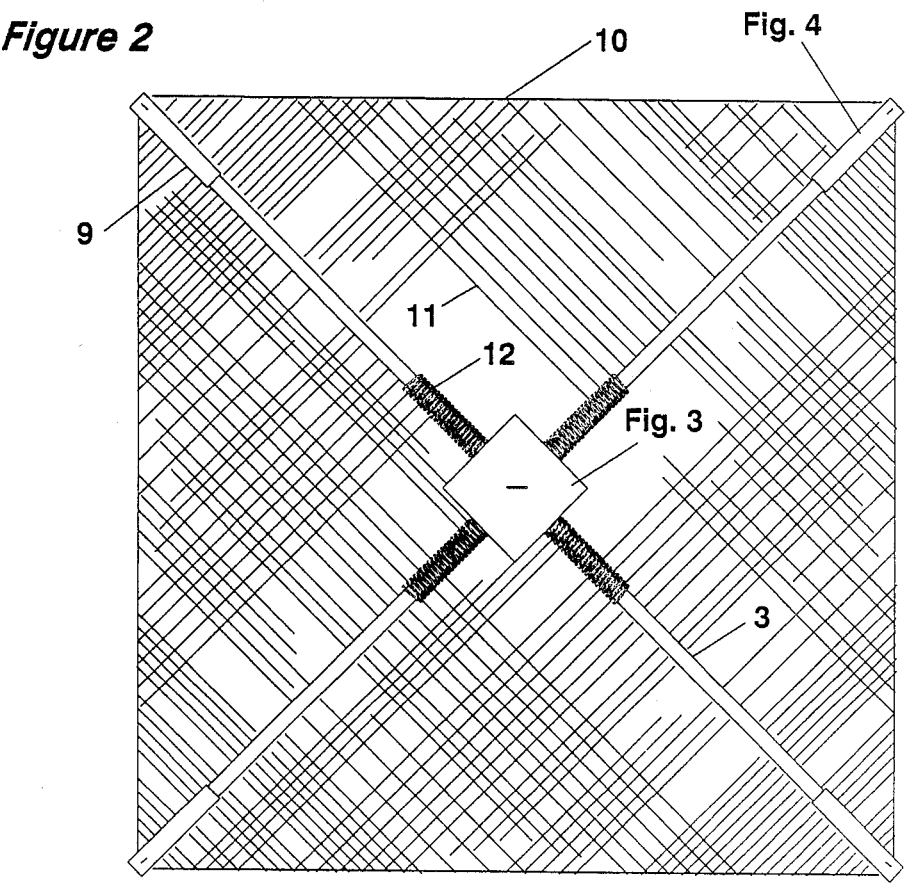
FIG. 2 is a plan view of the crab net.
Figure 3:
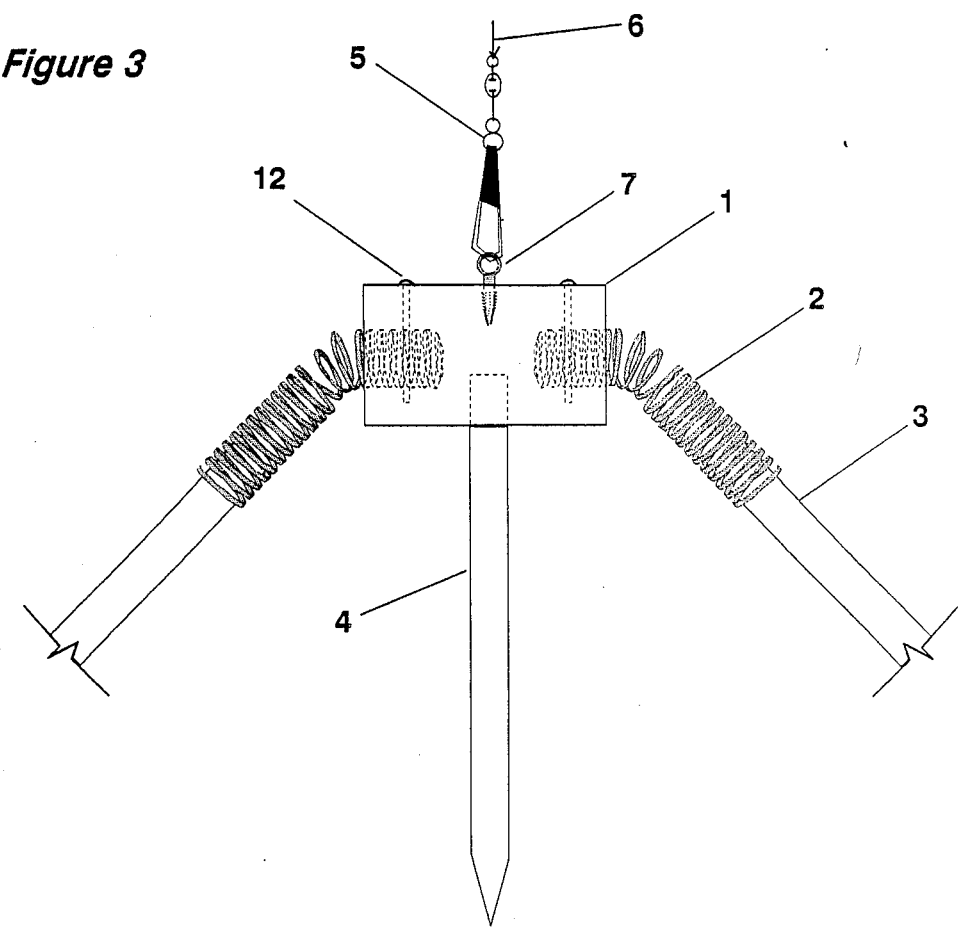
FIG. 3 is a partial view of the crab net at section "A"—"A".

Details of the hub block, 1, can be examined in FIG. 3. The block is made of any suitable type of buoyant material so as to allow the entire device to settle to the water bottom in an upright position. Each of the vertical sides of the block is shaped in a suitable manner to accommodate the attachment of a spring, 2. The bottom horizontal side of the hub block, 1, is shaped to accommodate the bait spike, 4, to which can be fastened any bait suitable for attracting crabs. In the deployed mode the rods, 3, springs, 2, and draw-strings, 10, all act in an interdependent manner to position the bait directly above and in the center of the net. In the center of the top horizontal side of the hub block, 1, a screw eye, 7, is attached to accommodate a fisherman's swivel latch, 5, and retrieval line, 6. The swivel latch operates in a manner similar to a safety pin and thus provides a secure line attachment with the added features of anti-twisting of the line and quick release from the hub block.

The Spring-Powered Crab Net can be deployed in many different ways. It can be dropped vertically, thrown several feet by hand, cast out with a sturdy rod and reel and can be retrieved by reeling in the line or by line recovery by hand from the shoreline, a pier, or a slow-moving boat. The position of the net in both the deployed mode and the retrieval mode is determined by the unique and unusual way in which the springs position the rods and draw-strings. Both modes are accomplished without the use of any mechanical device such as latches, movable slides or hinges. The draw-strings allow the edges of the net to move in a downward direction during retrieval which in turn allows the net to form a collapsing pouch around the crab from which it cannot escape. The entire device can be easily repaired in the field with readily obtainable materials and can be folded for storage into a compact, cone-shaped packet as depicted in FIG. 6.

Having thus described my invention, what I claim is:

1. A collapsible and expansible crab net comprising a net section attached by flexible draw-strings to the lower ends of upward-extending rigid rods whose upper ends are attached to a centrally located hub block by means of springs whose function is to allow the rigid rods to expand outwardly to hold the net open and flat when deployed upon the water bottom and said springs to allow the rods to deform downwardly when the crab net is retrieved by means of upward force upon a retrieval line attached to the hub block for that purpose.

2. A crab net according to claim 1 in which the draw-strings are woven through the outer edges of the net and attached to the lower ends of the rods in such manner that the weight of the crab in connection with the upward force upon the retrieval line causes the springs to deform allowing the rods to depress in a downward direction which in turn allows the net to slide downward along the draw-strings forming a pouch around the crab.

3. A crab net according to claim 2 in which the lower ends of the said rigid rods are encased in metal to cause the crab net to sink to the water's bottom and in which the said hub block is formed from a buoyant material to keep the entire device in a vertical position.

* * * * *